May 21, 1968 E. J. ASPELL ET AL 3,384,759
ANTICOINCIDENCE CIRCUIT
Filed May 20, 1965
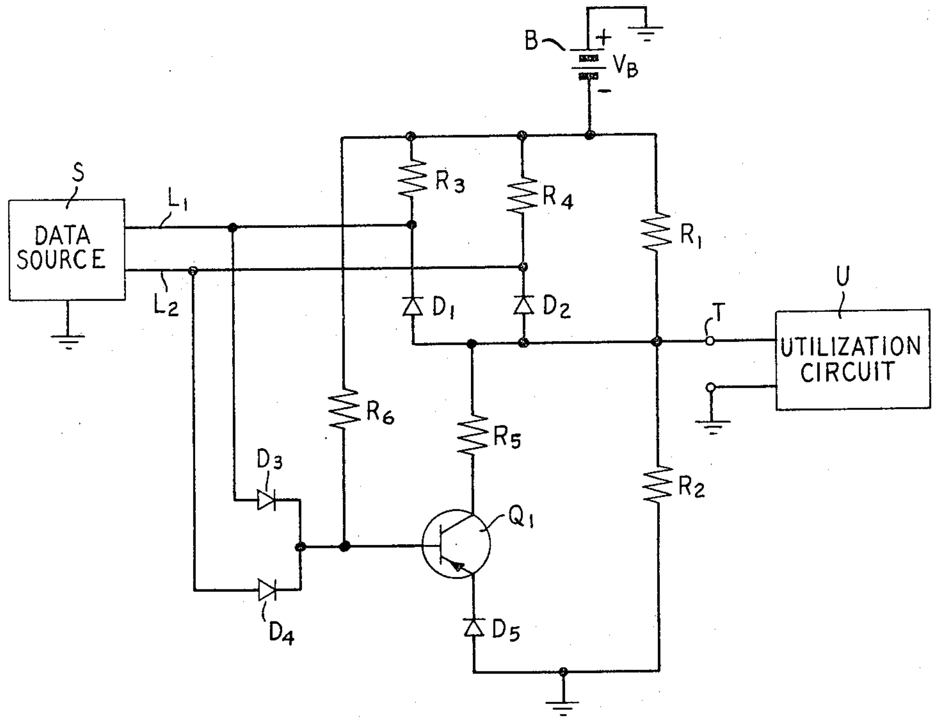
INVENTORS E. J. ASPELL
J. J. KOKINDA
BY
H. L. Logan
ATTORNEY United States Patent Office 3,384,759

Patented May 21, 1968

3,384,759
ANTICOINCIDENCE CIRCUIT

Edward J. Aspell, Roselle, and John J. Kokinda, South Plainfield, N.J., assignors to Bell Telephone Laboratories, Incorporated, New York, N.Y., a corporation of New York Filed May 20, 1965, Ser. No. 457,280
7 Claims. (Cl. 307—216)

This invention relates to electronic logic circuits and, in particular, to logic circuits of the exclusive-OR or anticoincidence type.

It is sometimes necessary in computers and other digital type apparatus to provide circuitry that produces a unique output signal when and only when a pair of input signals are dissimilar. Such circuits are referred to as exclusive-OR or anticoincidence gates.

The prior art discloses a number of exclusive-OR gates. Several of these prior art circuits use relatively small numbers of components which is generally preferable from reliability, cost and space requirement standpoints. These latter circuits are, however, few in number, thus limiting the choice open to an apparatus designer.

An object of this invention is to perform the exclusive-OR function using a relatively small number of components.

The invention, in one of its broader aspects, takes the form of a voltage divider. The upper portion of the voltage divider comprises three parallel-connected resistors while the lower portion comprises two parallel-connected resistors. Two of the upper resistors, which are equal in value to one another, are disconnected from the divider in response to a pair of input signals, respectively, while one of the lower resistors is disconnected from the divider in response to either of the input signals. The values of all the resistors are related so that the dividing ratio of the divider when both signals are absent is substantially the same as that when both of the signals are present. The output voltage from the divider is therefore substantially the same for both the presence or absence of both input signals. Because, however, only one of the upper and lower resistors are disconnected from the circuit when only one input signal is present, a different dividing ratio is produced and consequently an output voltage different from those produced for coincident inputs is produced. This different output voltage is indicative of an anticoincidence condition on the inputs.

Other objects and features of the invention will become apparent from a study of the following detailed description of a specific embodiment disclosed in the sole figure of the drawing.

In the disclosed embodiment of the invention, a pair of resistors $R_1$ and $R_2$ are connected in series across a direct current potential source B. Source B provides a potential of $V_B$ and has its positive terminal grounded. A resistor $R_3$ and a diode $D_1$ are connected in series across resistor $R_1$. Diode $D_1$ is connected to the junction between resistors $R_1$ and $R_2$ and is poled with respect to source B for easy current flow. Under these conditions, resistor $R_3$ is effectively connected in parallel with resistor $R_1$. A resistor $R_4$ and a diode $D_2$ are connected in series across resistor $R_1$ in a manner identical to that of resistor $R_3$ and diode $D_1$. Resistor $R_4$ is therefore also effectively connected in parallel with resistor $R_1$. Resistors $R_3$ and $R_4$ are substantially equal in resistance values.

A resistor $R_5$ is connected between the junction of resistors $R_1$ and $R_2$ and the collector of a transistor $Q_1$. The emitter of transistor $Q_1$ is connected through a diode $D_5$ to a point of ground potential while the base of the transistor is connected to the other terminal of the direct current potential source B by way of a resistor $R_6$. Source B, resistor $R_6$ and diode $D_5$ cooperate to forward bias transistor $Q_1$. Resistor $R_5$ is therefore effectively connected in parallel with resistor $R_2$.

Two outputs from a data source S are connected to the disclosed embodiment by output leads $L_1$ and $L_2$. Lead $L_1$ is connected to the junction between resistor $R_3$ and diode $D_1$ and also to a diode $D_3$ which, in turn, is connected to the base of transistor $Q_1$. Similarly, lead $L_2$ is connected to the junction between resistor $R_4$ and diode $D_2$ and also to a diode $D_4$ which, in turn, is connected to the base of transistor $Q_1$. Source S operates to cause leads $L_1$ and $L_2$ to be either clamped to ground potential or permitted to have potentials determined by the exclusive-OR circuit. In other words, as far as leads $L_1$ and $L_2$ are individually concerned, source S either presents an open circuit or a substantially zero impedance circuit to ground. The unclamped state of a lead may therefore be considered to represent a binary ZERO while the clamped state may be considered to represent a binary ONE. Whether these leads are clamped or not, of course, depends on the data output of source S.

The output of the embodiment appears between ground and a terminal T connected to the junction between resistors $R_1$ and $R_2$. A utilization circuit U is connected between terminal T and ground.

As will become apparent from the following detailed description of the operation of the disclosed embodiment, diodes $D_1$ and $D_2$ function as switches to remove the shunting effects of resistors $R_3$ and $R_4$, transistor $Q_1$ functions as a switch to remove the shunting effect of resistor $R_5$, and diodes $D_3$ and $D_4$ function as isolating elements to prevent undesirable crosscoupling between leads $L_1$ and $L_2$.

When source S presents open circuits to leads $L_1$ and $L_2$ (i.e. for a binary ZERO-ZERO output from source S in accordance with the previously mentioned convention), diodes $D_1$ and $D_2$ and transistor $Q_1$ are all forward biased and therefore in conductive states. Because the junction between resistor $R_3$ and diode $D_1$ and the junction between resistor $R_4$ and diode $D_2$ are at more negative potentials than the base of transistor $Q_1$, diodes $D_3$ and $D_4$ are reverse biased and therefore in their nonconductive states. Since the voltage drops across diodes $D_1$, $D_2$ and $D_5$ and transistor $Q_1$ are negligible when compared with the voltage drops across the various resistors, the voltage between output terminal T and ground is for practical purposes:

$$E_{00}=\left[\frac{\dfrac{R_2\ R_5}{R_2+R_5}}{\dfrac{R_2\ R_5}{R_2+R_5}+\dfrac{R_1\ \frac{R_3}{2}}{R_1+\frac{R_3}{2}}}\right]V_B \qquad (1)$$

(As stated previously, the value of resistor $R_3$ is substantially equal to that of resistor $R_4$; $R_3$ has therefore been substituted for $R_4$ in this and subsequent equations. The subscript for E implies this output is produced for a binary ZERO-ZERO output from source S.)

When source S clamps leads $L_1$ and $L_2$ to ground (i.e. for a binary ONE-ONE output from source S), diodes $D_1$ and $D_2$ are reverse biased and therefore in nonconductive states. Diodes $D_3$ and $D_4$ are, however, forward biased as a result of the path through resistor $R_6$ and are therefore in conductive states. Since the base of transistor $Q_1$ is now close to ground potential, the transistor is in a nonconductive state. The voltage appearing between terminal T and ground is:

$$E_{11}=\left[\frac{R_2}{R_1+R_2}\right]V_B \qquad (2)$$

When source S clamps only one of leads $L_1$ and $L_2$ to ground (i.e. for a binary ONE-ZERO or ZERO-ONE output from source S), transistor $Q_1$ is nonconductive while only one of diodes $D_1$ and $D_2$ is nonconductive. The voltage at terminal T is for practical purposes:

$$E_{10}=E_{01}=\left[\frac{R_2}{R_2++\frac{R_1\ R_3}{R_1+R_3}}\right]V_B \qquad (3)$$

In accordance with the invention, the value of resistor $R_4$ is substantially equal to that of resistor $R_3$. Furthermore, the dividing ratios for the two coincident input conditions are substantially equal to one another. As a result of these structural conditions, substantially the same output voltages appear for both coincident input conditions (i.e. $E_{00}=E_{11}$), substantially the same output voltages appear for both anticoincident input conditions (i.e. $E_{01}=E_{10}$), and the magnitude of the output voltages for the anticoincident input conditions is greater than the magnitude of the output voltages for the coincident input conditions. An anticoincident input condition is therefore readily recognized by the greater magnitude of the output voltage.

In order to practice the invention, the values for resistors $R_1$ through $R_5$ may be determined in the following manner. The values for resistors $R_1$ and $R_2$ are selected based upon loading requirements and the output potential level desired for coincident inputs. (The latter is determined by using Equation 2.) The value for resistors $R_3$ is next determined through the use of Equation 3 to give the desired output potential level for anticoincident inputs. The same value is used for resistor $R_4$. Since the same output potential level is desired for both coincident input conditions, the value of resistor $R_5$ is next obtained by setting the portions of Equations 1 and 2 to the left of the equal marks equal to one another and solving for $R_5$. When this is done, $$R_5=\frac{R_2R_3}{2R_1} \qquad (4)$$

Although only one embodiment of the invention has been discussed in detail, it is to be understood that various other embodiments may be devised by those skilled in the art without departing from the spirit and scope of the invention.

What is claimed is:

1. An anticoincidence circuit comprising,
a source of direct current potential,
a voltage divider connected across said source where said voltage divider comprises first and second serially connected resistors,
third, fourth and fifth resistors,
first normally enabled switching means connecting said third resistor in shunt with said first resistor,
second normally enabled switching means connecting said fourth resistor in shunt with said first resistor,
third normally enabled switching means connecting said fifth resistor in shunt with said second resistor,
means to apply a first signal to said first and third switching means to disable said first and third switching means,
means to apply a second signal to said second and third switching means to disable said second and third switching means,
utilization means, and
means connecting said utilization means in shunt with said second resistor.

2. A circuit in accordance with claim 1 in which the values of said third and fourth resistors are substantially equal to one another and the value of said fifth resistor is substantially equal to the product of the values of said second and third resistors divided by twice the value of said first resistor.

3. An anticoincidence circuit comprising,
a source of direct current potential,
a resistive voltage divider connected across said source where said voltage divider comprises first and second serially connected resistors,
first, second and third switching means,
third, fourth and fifth resistors,
means connecting said first switching means and said third resistor in series with respect to one another and the series combination formed thereby in shunt with said first resistor with said first switching means being normally enabled,
means connecting said second switching means and said fourth resistor in series with respect to one another and the series combination formed thereby in shunt with said first resistor with said second switching means being normally enabled,
means connecting said third switching means and said fifth resistor in series with respect to one another and the series combination formed thereby in shunt with said second resistor with said third switching means being normally enabled,
means for applying a first disabling signal to said first and third switching means,
means for applying a second disabling signal to said second and third switching means,
utilization means, and
means connecting said utilization means in shunt with said second resistor.

4. A circuit in accordance with claim 3 in which the values of said third and fourth resistors are substantially equal to one another and the value of said fifth resistor is substantially equal to the product of the values of said second and third resistors divided by twice the value of said first resistor.

5. An anticoincidence circuit comprising,
a source of direct current potential,
a voltage divider connected across said source where said voltage divider comprises first and second serially connected resistance circuits,
first and second normally enabled switching means connected in said first circuit to increase in increments the resistance thereacross when said first and second switching means are sequentially disabled in either order,
third normally enabled switching means connected in said second circuit to increase, when disabled, the resistance across said second circuit by an increment so that the dividing ratios of said divider are substantially the same when all of said switching means are disabled as when all of said switching means are enabled,
means to apply a first disabling signal to said first and third switching means,
means to apply a second disabling signal to said second and third switching means,
utilization means, and
means connecting said utilization means in shunt with said second resistance circuit.

6. An anticoincidence circuit comprising,
a source of direct current potential,
a voltage divider connected across said source where said voltage divider comprises first and second serially connected resistance circuits,
first and second normally enabled switching means connected in said first circuit to increase by a first fixed increment the resistance thereacross when either one of said first and second switching means is disabled and to further increase by a second fixed increment the resistance thereacross when the remaining switch is disabled in addition to said one switch already disabled,
third normally enabled switching means connected in said second circuit to increase, when disabled, the resistance across said second circuit by an increment so that the dividing ratios of said divider are substantially the same when all of said switching means are disabled as when all of said switching means are enabled, means to apply a first disabling signal to said first and third switching means,
means to apply a second disabling signal to said second and third switching means,
utilization means, and
means connecting said utilization means in shunt with said second resistance circuit.

7. An anticoincidence circuit comprising,
a source of direct current potential,
a voltage divider connected across said source where said voltage divider comprises first and second serially connected resistors,
a third resistor and a first diode connected in series across said first resistor with said first diode having one terminal connected to the junction between said first and second resistors and poled for easy current flow,
a fourth resistor and a second diode connected in series across said first resistor with said second diode having one terminal connected to said junction and poled for easy current flow,
a fifth resistor,
a transistor,
means connecting said fifth resistor and the collector-to-emitter path of said transistor in series across said second resistor and biasing said transistor so that said transistor is normally conducting,
first and second input terminals,
means connecting said first and second input terminals to said first and second diode terminals not connected to said junction, respectively,
means connecting said first and second input terminals to the base of said transistor,
an output terminal, and
means connecting said output terminal to said junction.

References Cited

UNITED STATES PATENTS

| | | | |
|---|---|---|---|
| 2,827,573 | 3/1958 | Eckert | 307—88.5 X |
| 2,892,099 | 6/1959 | Gray | 307—88.5 |
| 2,901,602 | 8/1959 | Younker | 328—159 |
| 3,309,531 | 3/1967 | Hearn et al. | 307—88.5 |

JOHN S. HEYMAN, *Primary Examiner.*

ARTHUR GAUSS, *Examiner.*

D. D. FORRER, *Assistant Examiner.*